US012625833B2

(12) United States Patent
Mclellan et al.

(10) Patent No.: US 12,625,833 B2
(45) Date of Patent: May 12, 2026

(54) FLEXIBLE POWER MANAGEMENT INTERFACE

(71) Applicant: SiFive, Inc., San Mateo, CA (US)

(72) Inventors: Edward Mclellan, Holliston, MA (US); Arjun Pal Chowdury, Austin, TX (US)

(73) Assignee: SiFive, Inc., Santa Clara, CA (US)

( * ) Notice: Subject to any disclaimer, the term of this patent is extended or adjusted under 35 U.S.C. 154(b) by 296 days.

(21) Appl. No.: 18/483,260

(22) Filed: Oct. 9, 2023

(65) Prior Publication Data
US 2024/0184344 A1 Jun. 6, 2024

Related U.S. Application Data

(60) Provisional application No. 63/429,843, filed on Dec. 2, 2022.

(51) Int. Cl.
| | |
|---|---|
| *G06F 13/38* | (2006.01) |
| *G06F 1/26* | (2006.01) |
| *G06F 13/40* | (2006.01) |
| *G06F 13/42* | (2006.01) |

(52) U.S. Cl.
CPC ............ *G06F 13/385* (2013.01); *G06F 1/266* (2013.01); *G06F 13/40* (2013.01); *G06F 13/42* (2013.01)

(58) Field of Classification Search
CPC .......... G06F 1/266; G06F 1/28; G06F 1/3203; G06F 13/385; G06F 13/387; G06F 13/40; G06F 13/4063; G06F 13/4269; G06F 13/4286; G06F 13/42

See application file for complete search history.

(56) References Cited

U.S. PATENT DOCUMENTS

| | | | | |
|---|---|---|---|---|
| 7,133,958 | B1 * | 11/2006 | Kuskin | ................. G06F 13/385 |
| | | | | 710/313 |
| 2004/0268278 | A1 * | 12/2004 | Hoberman | ............ G06F 1/3203 |
| | | | | 716/127 |
| 2009/0043935 | A1 * | 2/2009 | Huomo | ................... G06K 19/07 |
| | | | | 710/301 |
| 2013/0086283 | A1 * | 4/2013 | Miller | ................. G06F 13/4072 |
| | | | | 710/11 |
| 2018/0101219 | A1 * | 4/2018 | Ross | ...................... G06F 1/3206 |
| 2019/0102335 | A1 * | 4/2019 | Tan | ...................... G06F 13/4221 |
| 2022/0413593 | A1 * | 12/2022 | Kakkireni | ............... G06F 1/324 |
| 2024/0403256 | A1 * | 12/2024 | Vermeer | ............ G06F 13/4068 |

* cited by examiner

*Primary Examiner* — Thomas J. Cleary
(74) *Attorney, Agent, or Firm* — Kilpatrick Townsend & Stockton LLP

(57) ABSTRACT

Systems and methods are described for a flexible and selectable power management interface. The flexible and selectable power management interface can provide multiple power management interfaces which are selectable based on a selected processor IP core, a selected power management controller, and a variety of factors. The flexible and selectable power management interface can be a direct handshake hardware interface, a memory-mapped bus interface, or a combination of the direct handshake hardware interface and the memory-mapped bus interface.

20 Claims, 9 Drawing Sheets

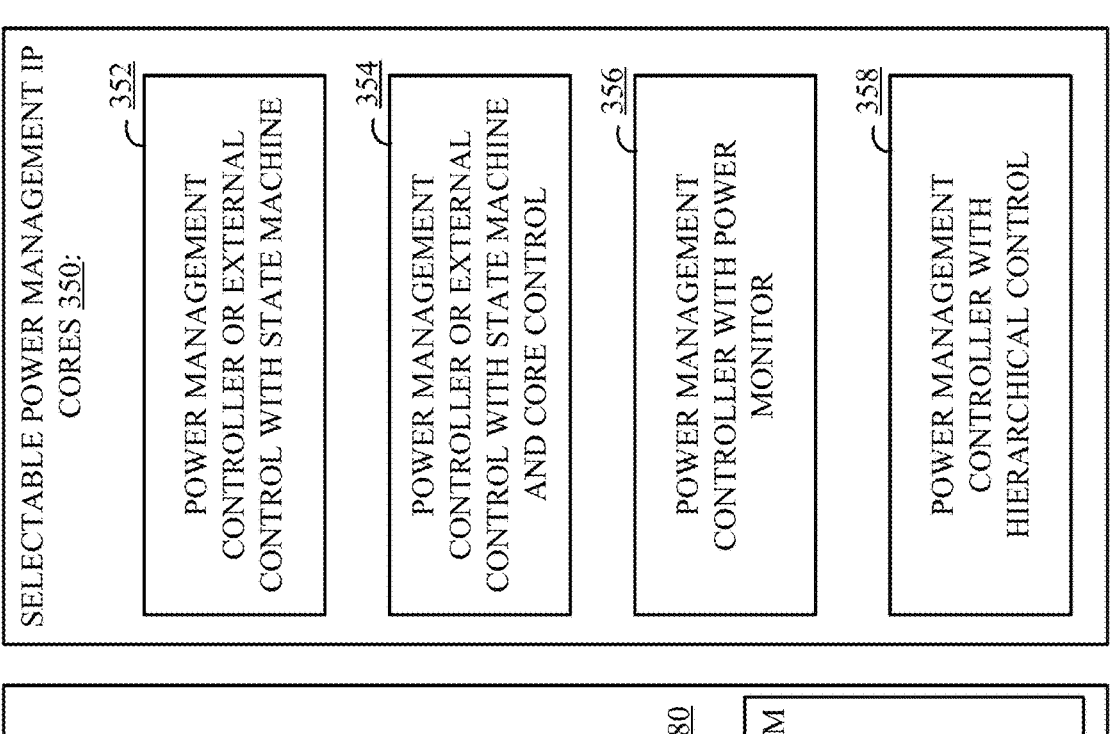

SELECTABLE POWER MANAGEMENT IP CORES 350:

352
POWER MANAGEMENT CONTROLLER OR EXTERNAL CONTROL WITH STATE MACHINE

354
POWER MANAGEMENT CONTROLLER OR EXTERNAL CONTROL WITH STATE MACHINE AND CORE CONTROL

356
POWER MANAGEMENT CONTROLLER WITH POWER MONITOR

358
POWER MANAGEMENT CONTROLLER WITH HIERARCHICAL CONTROL

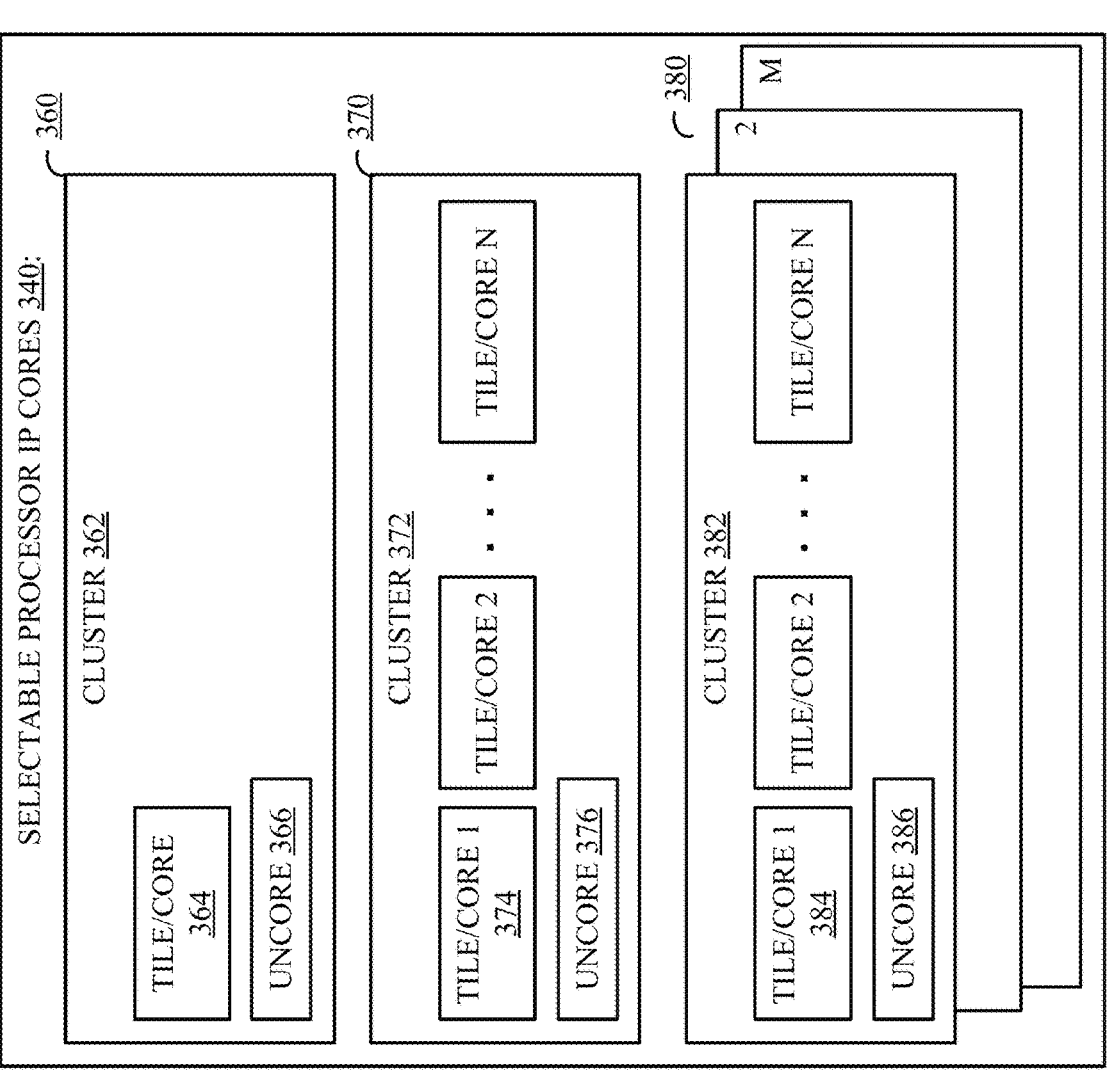

SELECTABLE PROCESSOR IP CORES 340:

360
CLUSTER 362
TILE/CORE 364
UNCORE 366

370
CLUSTER 372
TILE/CORE 1 374
TILE/CORE 2 . . . TILE/CORE N
UNCORE 376

380
2
M
CLUSTER 382
TILE/CORE 1 384
TILE/CORE 2 . . . TILE/CORE N
UNCORE 386

SELECT POWER MANAGEMENT
INTERFACE

610

RUN AUTOMATED IC BUILD
SYSTEM

620

FLEXIBLE POWER MANAGEMENT INTERFACE

CROSS REFERENCE TO RELATED APPLICATION

This application claims priority to and the benefit of U.S. Patent Application Ser. No. 63/429,843, filed on Dec. 2, 2022, the entire disclosure of which is hereby incorporated by reference.

TECHNICAL FIELD

This disclosure relates generally to integrated circuits and, more specifically, to flexible and selective power management interface architectures.

BACKGROUND

Power is tied to overall system-on-chip (SoC) performance including, but not limited to, battery life, energy consumption, thermal profile, cooling requirements, noise profile, system stability, sustainability, and operational costs. Power management techniques can be used to control power consumption by controlling the clock rate and by using voltage scaling, power gating, and other techniques.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 3A is a block diagram of example selectable IP cores and example power management IP cores.

DETAILED DESCRIPTION

Figure 1:
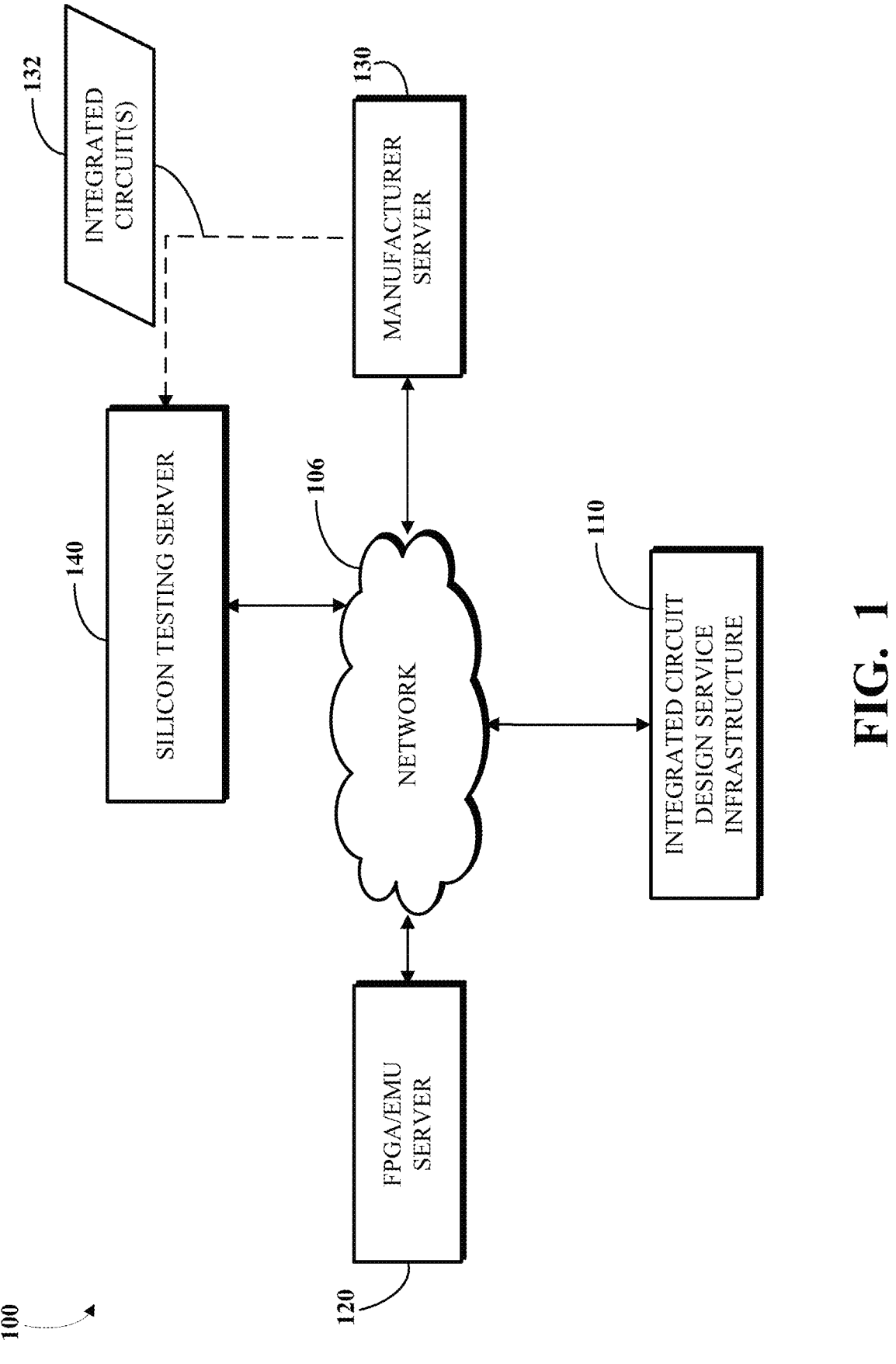
FIG. 1 is a block diagram of an example of a system for facilitating generation and manufacture of integrated circuits.

Power management is a critical aspect of integrated circuits. Performance limitations due to power have resulted in many power management techniques or modes used in chip designs. Increased granularity and specificity of these power modes enable designs to minimize power required to deliver desired performance levels. Power modes often involve modifying operational parameters including dynamic voltage and frequency scaling (DVFS) when circuits are active and dynamically gating or disconnecting portions of the circuit from the power distribution system when circuits are idle. Operational parameter modification is typically done outside of the normal functional operation of the circuit using a power management interface to dedicated power and clock control logic.

Disclosed herein are systems and methods for a flexible and selectable power management interface. Processor intellectual property (IP) cores are available in a range of configurations or architectures where the number of cores, clusters, or both can vary. A one size fits all power management interface is not practical or efficient in terms of chip space, costs, and other factors. The flexible and selectable power management interface can provide multiple power management interfaces which are selectable based on a selected processor IP core and a variety of factors. Upon selection of the processor IP core and the power management interface, a system for automated integrated circuit design, such as described in U.S. Pat. No. 11,048,838, filed Aug. 1, 2019, the contents of which are herein incorporated by reference in its entirety, and which is assigned to the Applicant (the "'838 Patent") and which is included as Appendix A, can be used to generate the integrated circuit, processing system, or SoC.

The power management interface can be implemented using a variety of techniques. One implementation can be a direct handshake hardware interface from each power domain under control. In this sense, a power domain can include a core, a tile, a cluster of cores and/or tiles, a complex, and other circuits in a SoC. The direct handshake hardware interface can be suitable for relatively smaller designs with clearly defined requirements and relatively few power domains and modes. Larger designs, with more power domains and modes benefit from a more flexible implementation, such as a shared bus or a memory-mapped bus for better scalability and extensibility. Other implementations can provide a mixed direct handshake hardware interface and a bus interface for different power domains in a SoC Internal control logic in a power domain can be configured to use the direct hardware interface, the flexible, memory mapped bus-based approach, or a hybrid approach. In all implementations, the internal control logic is similar with a consistent software interface. The flexible and selectable power management interface is required to support a wide range of computing solutions from a common architecture within varying design constraints of power, area, and design time.

To describe some implementations in greater detail, reference is first made to examples of hardware and software structures used to implement a system including selection of and building a selected power management interface in an integrated circuit. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-5.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/ mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
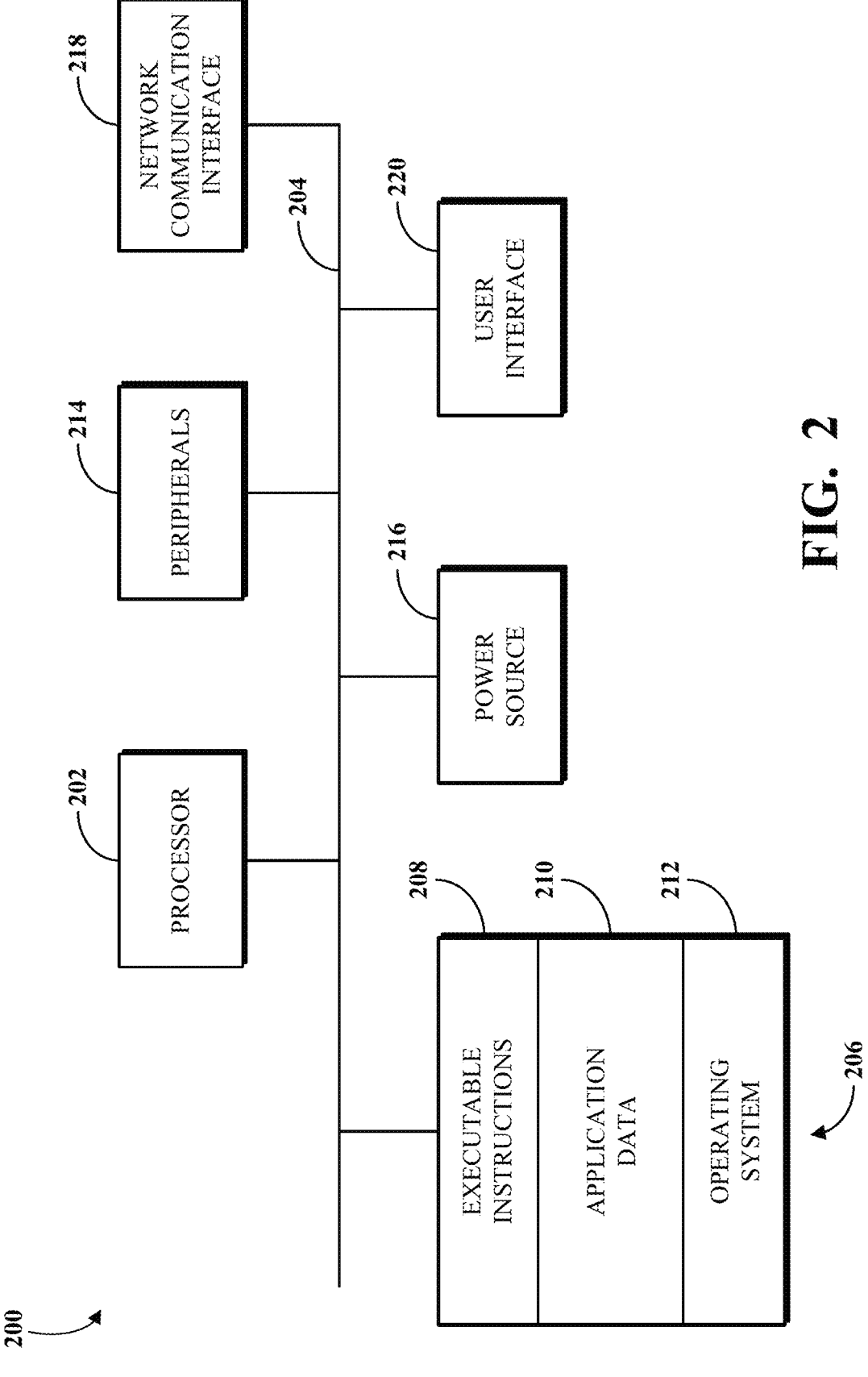
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-5.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation. Further description is provided in Appendix A, which is incorporated herein in this specification.

Figure 3:
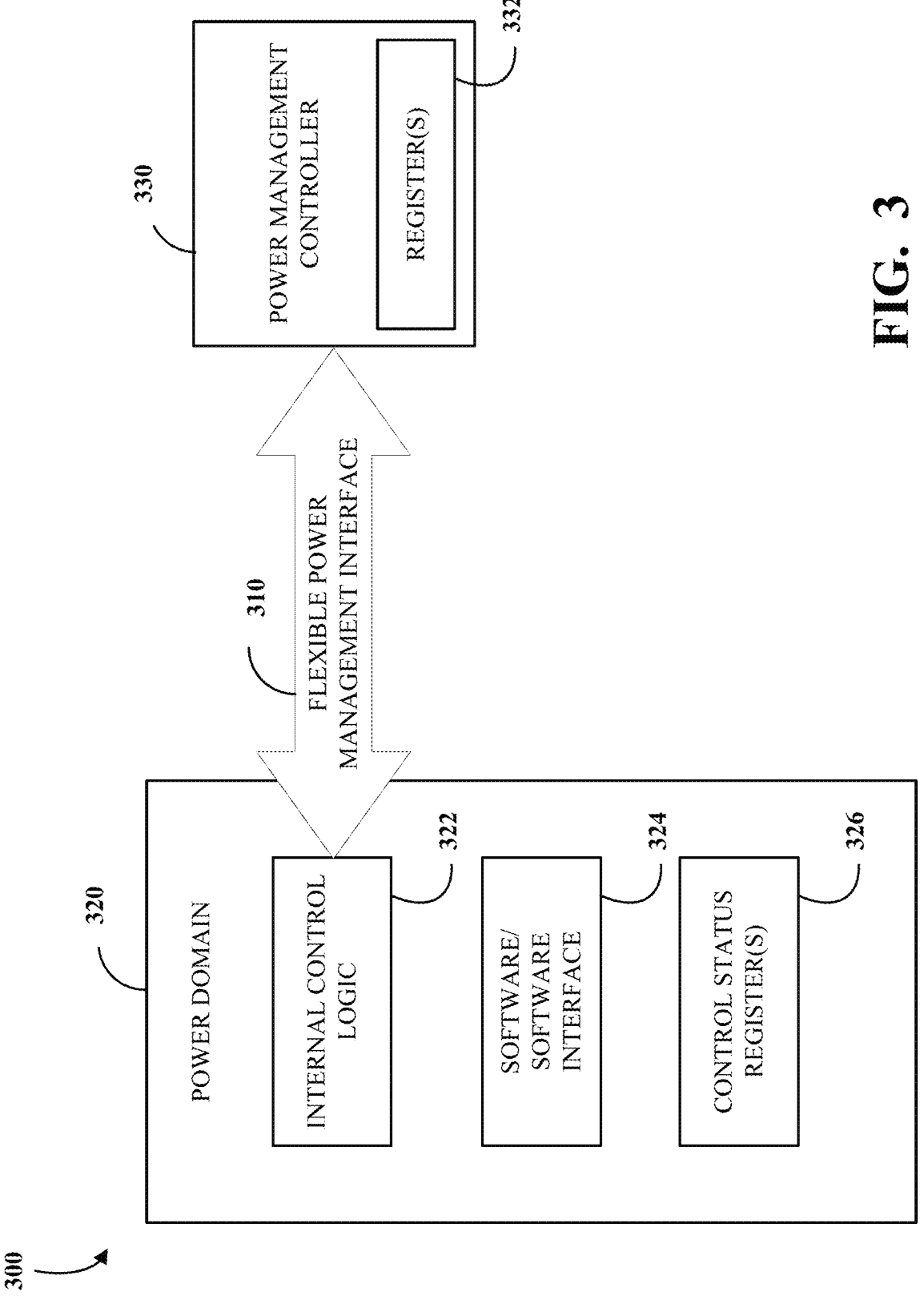
FIG. 3 is a block diagram of an example of a system including a flexible or selectable power management interface.

FIG. 3 is a block diagram of an example of a system 300 including a flexible or selectable power management interface 310. The system 300 can include one or more power domains 320 which are connected to a power management controller 330 via the power management interface 310. The power management controller 330 is an external controller with respect to the one or more power domains 320. For example, the one or more power domains 320 can be one or more of the selectable IP cores and the power management controller 330 can be one or more of the power management IP cores, both of which are described in U.S. Patent Publication No. US20230015240, filed Jun. 28, 2022, the contents of which are incorporated herein by reference as if set forth herein.

For example, FIG. 3A is a block diagram of example selectable IP cores 340 and example power management IP cores 350 as described in U.S. Patent Publication No. US20230015240.

The selectable processor IP cores 340 can include, but is not limited to, processor IP cores 360, 370, and 380. For example, the processor IP core 360 can include, but is not limited to, a cluster 362 which includes, but is not limited to, a tile or core 364 connected to an uncore 366. The processor IP core 370 can include, but is not limited to, a cluster 372 which includes, but is not limited to, tiles or cores 1, 2, . . . , N 374 connected to an uncore 376. The processor IP core 380 can include, but is not limited to, clusters 1, 2, . . . , M 382 each of which includes, but is not limited to, tiles or cores 1, 2, . . . , N 384 connected to an uncore 386. In this instance, an uncore can include a control interconnection network, a system interconnection network, a front port, a system port, and uncore components which can include, but is not limited to, a last level cache, clock circuits, interrupt controllers and circuits, debug circuits, a debug manager, wrappers, command line interrupt circuits and controllers, cache coherence manager, and caches. Selection of a processor IP core can be based on needs, application, functionality, and/or combinations thereof.

The power management IP core 352 can be a power management controller or external controller with a finite state machine. The power management IP core 354 can be a power management controller or external controller with a finite state machine and core control. The power management IP core 356 can be a power management controller with power monitoring. The power management IP core 358 can be a power management controller with hierarchical control. Each power management IP core 352, 354, 356, and 358 can include the features and/or functionality of earlier power management IP cores 352, 354, and 356. That is, the power management IP cores 352, 354, 356, and 358 are hierarchical and selected based on a selected processor IP core.

The processor IP cores 360, 370, and 380 can be matched up with one of the selectable power management IP cores 350, including, but not limited to, power management IP core 352, 354, 356, and 358.

Each or some of the one or more power domains 320 can include an internal control logic or internal controller 322, software and/or software interface 324, and one or more registers 326. The internal control logic 322 is configured for connectivity, operability, and compatibility with any power management interface selected from the flexible or selectable power management interface 310. The internal control logic 322 can initiate or request idle power mode transitions with the power management controller 330 and/or can be responsive to an idle power mode transition requests from the power management controller 330 using an idle power mode transition protocol as described herein. The software and/or software interface 324 can prepare the power domain 320 for an idle power mode transition. In implementations, the preparation can include cache flushing, interrupt management, security management, and other device state management. The software and/or software interface 324 can program an associated configuration register, such as one of the one or more registers 326, for a specific idle power mode control such as, for example, entry delays, and/or a hint value. The one or more registers 326 can be control status registers.

The flexible or selectable power management interface 310 can include multiple hardware transport options. The multiple hardware transport options can include a direct handshake hardware interface, a shared bus, a memory-mapped bus, and/or any combination thereof. Selection of a power management interface selected from the flexible or selectable power management interface 310 can depend on a variety of factors including, but not limited to, the number of power domains 320, a type of power domain 320, size of power domain, power management modes needed, level or granularity of power management control needed for the system 300, level or granularity of operational control needed for the system 300, level or granularity of performance control needed for the system 300, power level of the system 300, and a variety of other factors.

The direct handshake hardware interface is a wired power management. The direct handshake hardware interface can minimize the number of pins for small systems. The direct handshake hardware interface has a separate communication channel from the internal control logic or internal controller 322 for each additional power domain under control. Each communication channel can transmit a hint value and acknowledgement (ack)/negative acknowledgment or not acknowledged (nack) response signals from the internal control logic or internal controller 322. Each communication channel can transmit a mode request and mode value from the power management controller 330, where a mode request is a request to transition to one of the multiple idle power modes relevant to the power domain and the mode value is value representing or indicating the idle power mode.

The shared bus or memory-mapped bus interface can carry information identical to the direct handshake hardware interface between the internal control logic or internal controller 322 and the power management controller 330 using memory-mapped (MMIO) register transfers, such as by using encoded fields. The shared bus or memory-mapped bus interface can provide registers 332 accessible to internal controllers for communication of idle power mode transition protocol messages as described herein. For example, the messages can be a hint and/or an ACK/NACK message. In addition, the shared bus or memory-mapped bus interface can access the registers such as the one or more registers 326 in the power domain. Changes to a shared bus or memory-mapped bus interface are not needed when cores or power domains are added to the system 300. In addition, the shared bus or memory-mapped bus interface, such as for example power management controller 356 or 358, can provide greater controller capabilities through access to system activity information.

In implementations, each of the power domains can be in one of multiple idle power modes. Idle power modes may include a range of power reduction options with varying resumption times. Generally, more power reduction requires longer resumption time. That is, idle power modes generally provide increasing power reduction with increasing resumption latencies. However, increased or maximum power savings, including powering off, can require undergoing a reset process.

The idle power modes can be defined for a power domain, one or more sub-units of the power domain, and/or combinations thereof. The one or more sub-units of the power domain can be one or more cores, one or more tiles, one or more vector units, other components in the power domain, and/or combinations thereof. In implementations, one or more idle power modes may not be supported by a power domain. In an implementation, the multiple idle power modes can include, for example, a live retention mode where logic and/or core operations can be suspended with associated states retained and a RAM retained in sleep mode. This idle power mode does not require a reset. In another implementation, the multiple idle power modes can include, for example, a deep retention mode where logic and/or core operations can be powered off and a RAM retained in sleep mode. This idle power mode may require a partial reset. In yet another implementation, the multiple idle power modes can include, for example, a power gate mode where the power domain can be powered off. No states are retained. This idle power mode will require a reset.

Figure 3B:
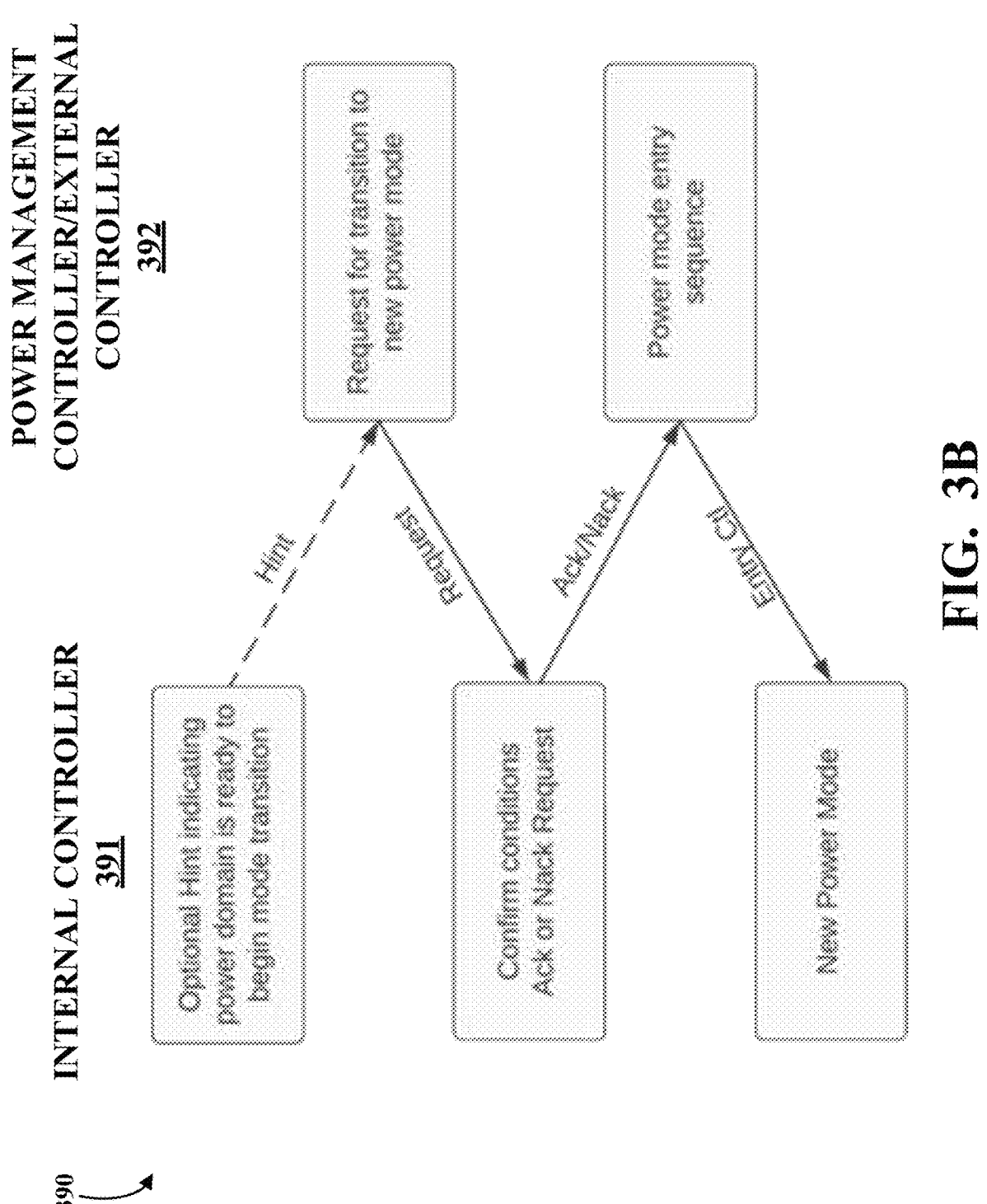
FIG. 3B is a flow diagram of an example of an idle power mode transition protocol.

FIG. 3B is a flow diagram 390 of an example of an idle power mode transition protocol. The flow diagram 390 is between an internal controller 391 in a power domain and a power management controller 392. Idle power mode transitions follow a similar sequence between the internal controller 391 and power management controller 392 regardless of a selected power management interface. That is, communication between the power management controller and the internal controller can be done using either the direct handshake hardware interface or direct wired interface, or a shared or bus-based MMIO interface. The messaging between the internal controller 391 and power management controller 392 can use appropriate messages and/or encodings to request, confirm, initiate, and execute an idle power mode transition.

In implementations, the internal controller 391 can send a hint to the power management controller 392. The sending of the hint can be optional and can represent the current state of the power domain or portion thereof associated with the internal controller 391. The sending of a hint can indicate that the power domain or portion thereof is ready to undergo an idle power mode transition. Hint notification from the internal controller 391 to the power management controller 392 is generally initiated by hardware based on the configuration. That is, an idle power mode transition is typically initiated by a hardware event (e.g., idleness, interrupt, timer, forced reset, debug assistance, other issues requiring power domain isolation) as configured by software (such as software 324) via a register (such as register 326).

The power management controller 392 can send a request for transition to an idle power mode to the internal controller 391. In implementations, the request may be responsive to the hint. In implementations, the request may not be responsive to the hint indication sent by the internal controller 391 to the power management controller 392. The internal controller 391 can send an ACK and/or NACK indicating confirmation of the idle power mode request based on current and expected activity. In implementations, if the power domain is currently in an idle power mode, an additional requirement must be satisfied that there is no expected activity. This can be ensured by either the internal controller 391 or the power management controller 392 through management of wakeup sources. For example, asynchronous events such as interrupts to a core, or bus transactions to a sub-unit must be delayed until after a subsequent transition back to an operational mode. Managing asynchronous wakeup events may be accomplished by the internal controller 391 before responding with an ACK, or by the power management controller 392 before requesting the idle power mode transition. The power management controller 392 may only proceed with the idle power mode transition after receiving an ACK response.

The power management controller 392 can, responsive to an ACK, send an idle power mode entry control message to the internal controller 391, which in turn can place the power domain into the idle power domain. In implementations, the internal controller 391 retains control of what idle power mode can be executed as the internal controller 391 has access to the latest power domain transactions.

In implementations, active mode transitions can be supported in addition to the idle power mode transitions.

For example, if the external power controller configured the power domain with operational limits or guidelines such as instructions retired per cycle or instructions retired per unit of time, then the power domain can send hint messages to the power controller when that operation is observed and the power controller can modify operational parameters such microarchitectural reconfiguration or DVFS to improve the power efficiency. If the program is executing at a high rate of instructions per cycle or per time, enabling and powering an additional execution unit held in reserve may reduce the per-instruction power cost to execute the program. Conversely, if the program is executing at a low rate of instructions per cycle or per time, powering off a redundant execution unit may reduce the per-instruction power cost.

Figure 4:
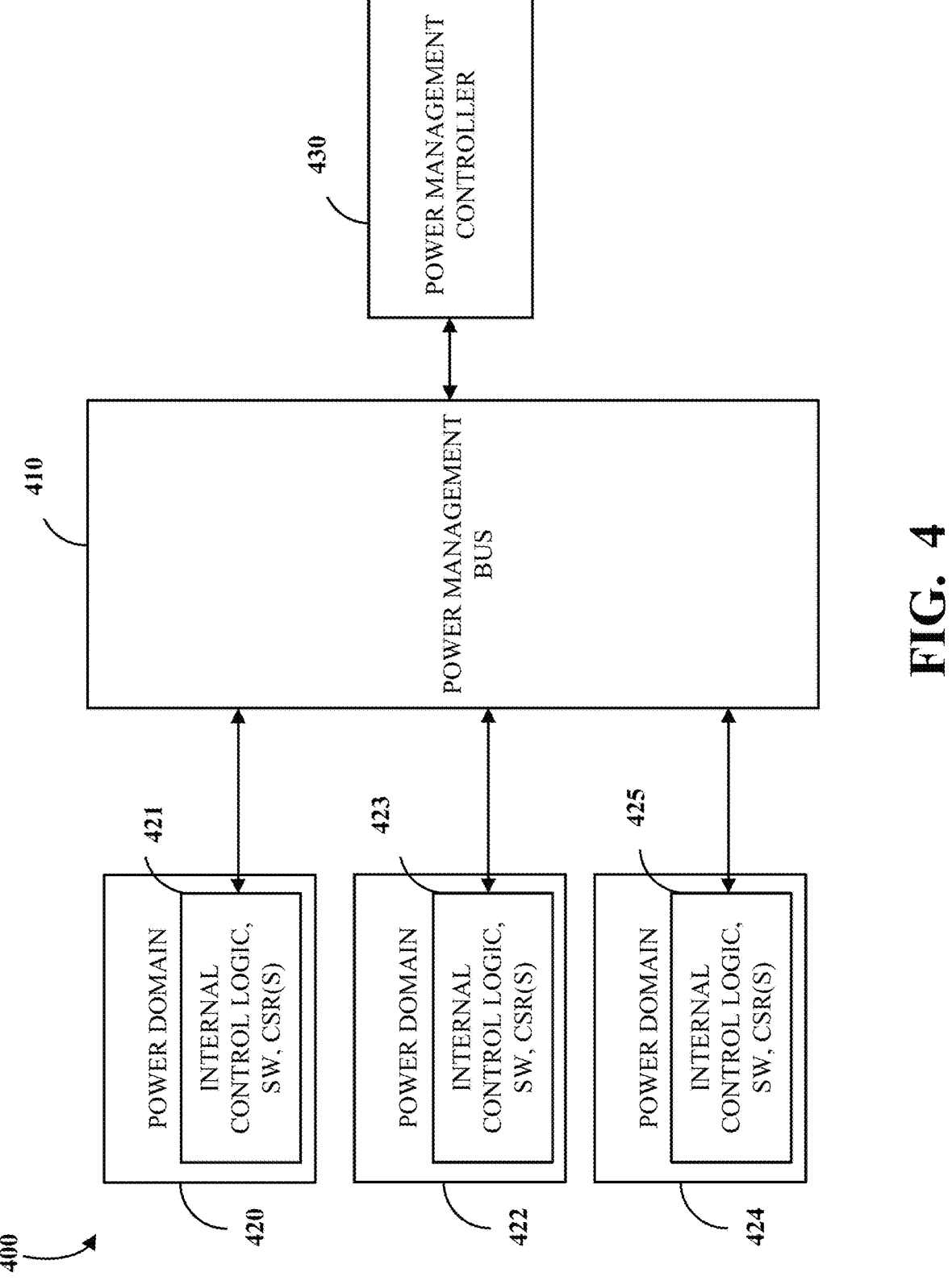
FIG. 4 is a block diagram of an example of a system including a flexible or selectable power management interface which is a power management bus.

FIG. 4 is a block diagram of an example of a system 400 including a flexible or selectable power management interface which is a power management bus 410. The components described in FIG. 4 can be the relevant components described in FIGS. 3 and 3A. The system 400 can include one or more power domains 420, 422, and 424, which are connected to a power management controller 430 via the power management bus 410. For example, the one or more power domains 420, 422, and 424 can be one or more of the selectable IP cores described in U.S. Patent Publication No. US20230015240, filed Jun. 28, 2022, the contents of which are incorporated herein by reference as if set forth herein, and for which a summary is provided with respect to FIG. 3A. and the power management controller 430 can be one or more of the power management IP cores described in U.S. Patent Publication No. US20230015240, filed Jun. 28, 2022, the contents of which are incorporated herein by reference as if set forth herein, and for which a summary is provided with respect to FIG. 3A. The one or more of the selectable IP cores can be a subset or internal portion of a core or operational aspect of the design that affects the power efficiency such as the pipeline width, fetch or prefetch aggressiveness. Each or some of the one or more power domains 420, 422, and 424 includes an internal control logic, software, and/or registers 421, 423, and 425 which are configured for operation with the power management bus 410. In this instance, the power management bus 410 can provide area efficient and flexible connectivity to substantially any number of power domains including the power domains 420, 422, and 424.

In implementations, active mode transitions can be supported in addition to the idle power mode transitions described herein. The power management controllers and/or external controllers described herein can configure a power domain (as described herein) with operational limits or guidelines such as, but not limited to, instructions retired per cycle or instructions retired per unit of time. The power domain can then send hint messages to the power management controllers and/or external controllers when that operation is observed and the power management controllers and/or external controllers can modify operational parameters via microarchitectural reconfiguration or DVFS to improve the power efficiency. If the program is executing at a high rate of instructions per cycle or per time, enabling and powering an additional execution unit held in reserve can reduce the per-instruction power cost to execute the program. Conversely, if the program is executing at a low rate of instructions per cycle or per time, powering off a redundant execution unit can reduce the per-instruction power cost.

Figure 5:
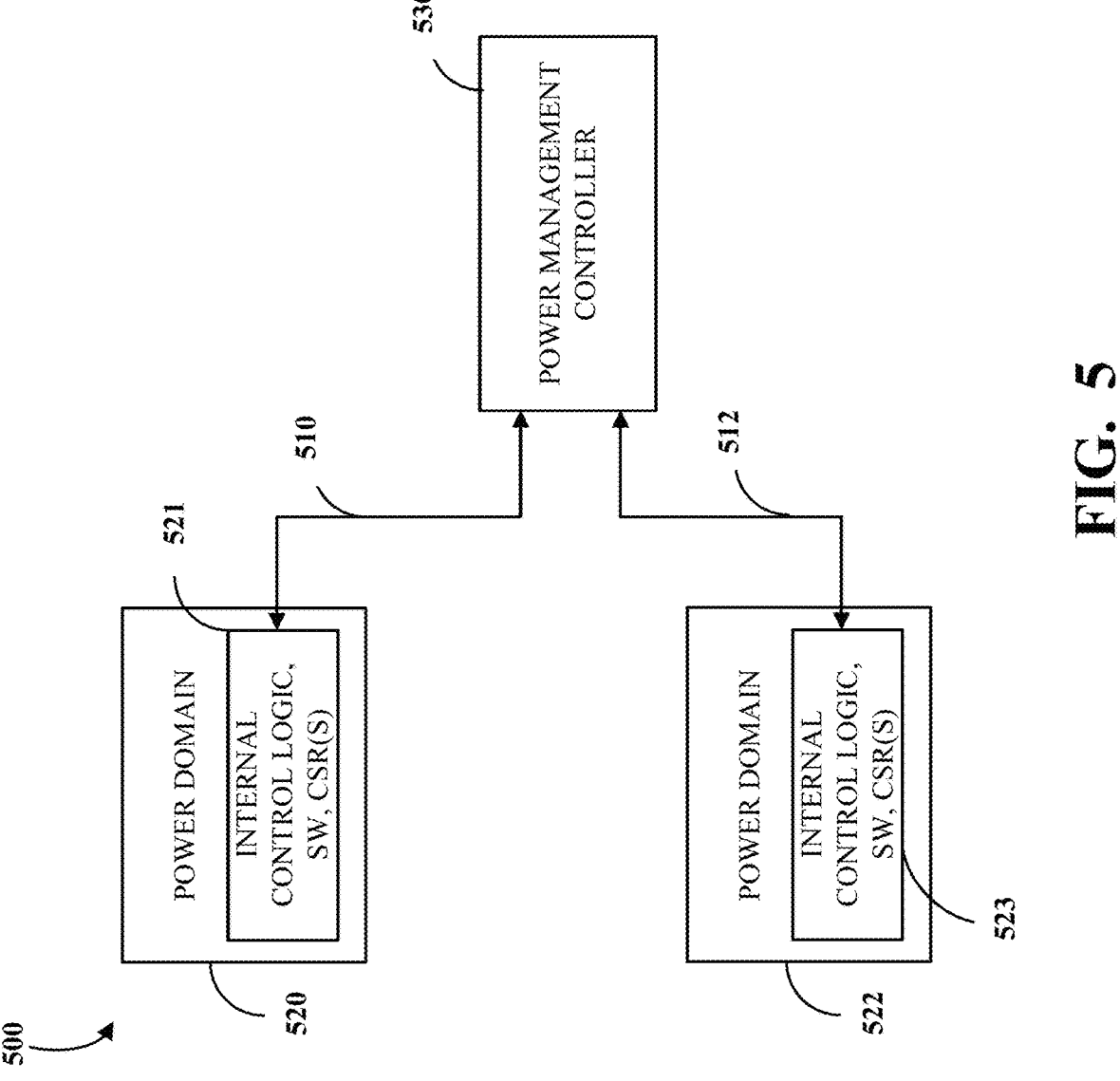
FIG. 5 is a block diagram of an example of a system including a flexible or selectable power management interface which is a direct hardware or wire connection.

FIG. 5 is a block diagram of an example of a system 500 including a flexible or selectable power management interface which are direct handshake hardware interfaces 510 and 512. The components described in FIG. 5 can be the relevant components described in FIGS. 3 and 3A. The system 500 can include one or more power domains 520 and 522, which are connected to a power management controller 530 via the direct handshake hardware interfaces 510 and 512. For example, the one or more power domains 520 and 522 can be one or more of the selectable IP cores described in U.S. Patent Publication No. US20230015240, filed Jun. 28, 2022, the contents of which are incorporated herein by reference as if set forth herein, and for which a summary is provided with respect to FIG. 3A and the power management controller 530 can be one or more of the power management IP cores described in U.S. Patent Publication No. US20230015240, filed Jun. 28, 2022, the contents of which are incorporated herein by reference as if set forth herein, and for which a summary is provided with respect to FIG. 3A. The selectable IP cores can be a subset or internal portion of a core or operational aspect of the design that affects the power efficiency such as the pipeline width, fetch or prefetch aggressiveness. Each or some of the one or more power domains 520 and 522 includes an internal control logic, software, and/or registers 521 and 523 which are configured for operation with the direct handshake hardware interfaces 510 and 512. In this instance, the direct handshake hardware interface can take less area for implementation versus a bus implementation.

Figure 6:
FIG. 6 is a block diagram of an example of a method for selecting a power management interface in an integrated circuit.
Figure 6:
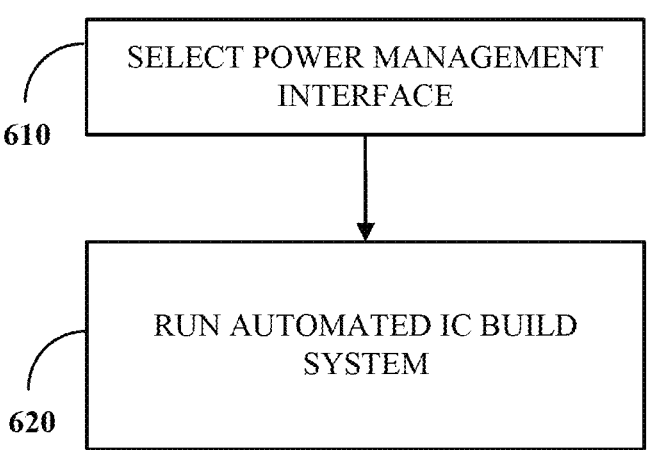

FIG. 6 is a block diagram of an example of a method or technique 600 for selecting a power management interface in an integrated circuit. The technique 600 includes: selecting 610 a power management interface and running 620 an automated integrated circuit build system. The technique 600 can be implemented, for example, in the system 100 and the system 200 to build the system 300, the system 400, and the system 500, as appropriate and applicable.

The technique 610 includes selecting 11100 a power management interface. An automated integrated circuit build system can provide a web interface for parameter selection for building of a processing system, SoC, and/or integrated circuit. This can include selection of a power management interface. For example, FIG. 7, as described herein, is a diagram of an example display region generated for presenting a web interface to facilitate customized design of an integrated circuit with a selected power management interface.

The technique 600 includes running 620 an automated integrated circuit build system. Once the power management interface is selected along with other design parameters, the automated integrated circuit build system can output an integrated circuit design or SoC based on the selected power management interface.

Figure 7:
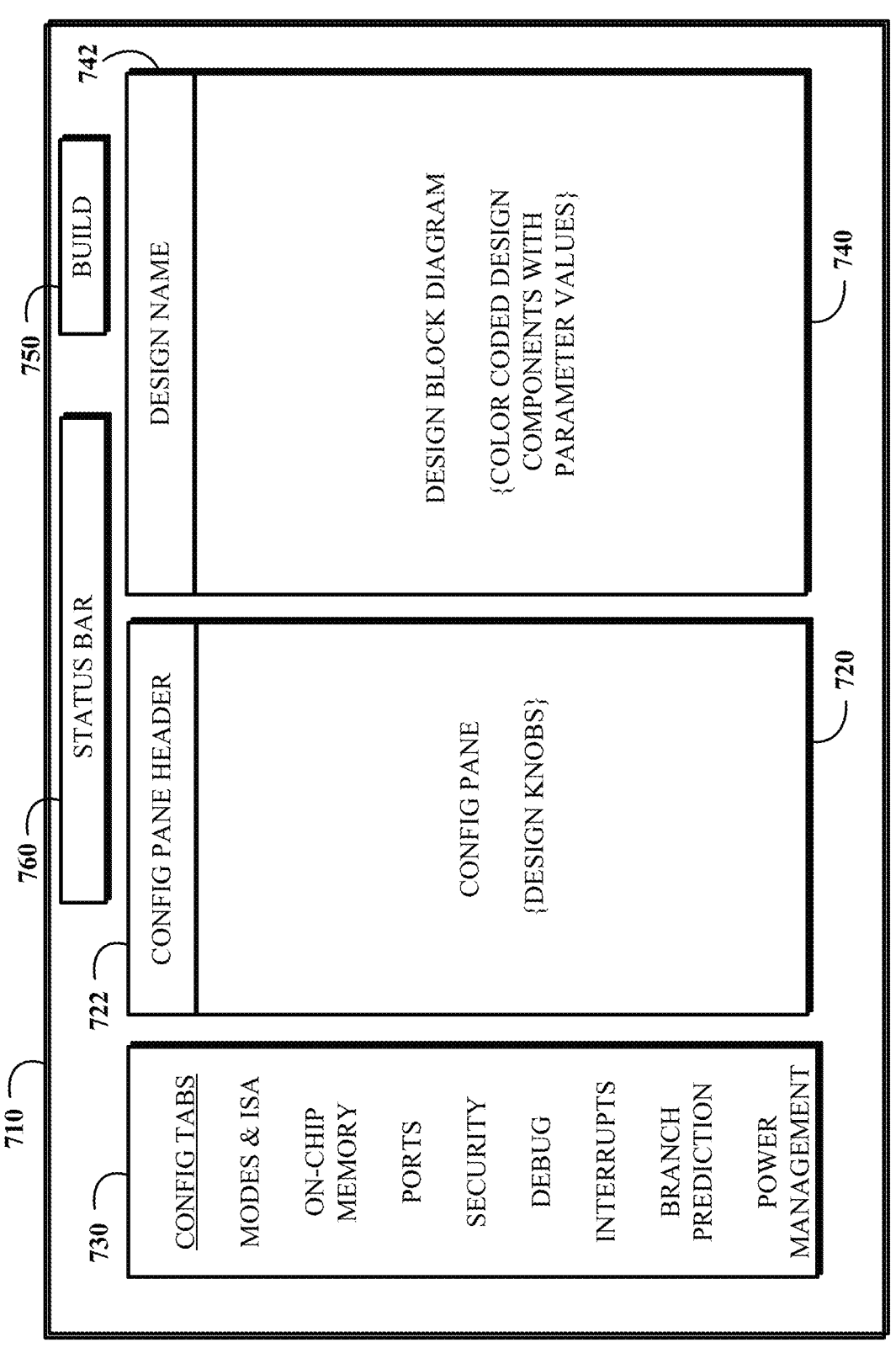
FIG. 7 is a diagram of an example display region generated for presenting a web interface to facilitate customized design of an integrated circuit with a selected power management interface.

FIG. 7 as described herein, is a diagram of an example display region generated for presenting a web interface to facilitate customized design of an integrated circuit with a selected power management interface. The display region 710 includes a configuration pane 720 that includes design knobs that can used to select values of design parameters for an integrated circuit design, and has a configuration pane header 722 that shows the name of a currently displayed category of design knobs. The display region 710 includes a configuration tabs menu 730 that includes icons that allow a user to select a category of design knobs to be displayed in the configuration pane 720 and available for adjustment by the user. For example, the categories of design knobs may include modes & ISA, on-chip memory, ports, security, debug, interrupts, branch prediction, and power management including the power intent definition to generate a Unified Power Format (UPF) companion file for the RTL as defined by IEEE 1801. The design knobs may provide a way of displaying the design parameter values in a design parameter data structure visually and summarizing. The design knobs may facilitate easy changes to design parameter values. In some implementations, the design knobs may be updated in real-time to reflect dependencies between different design parameters by disabling or constraining the values of one design parameter based on another.

The display region 710 includes a design block diagram 740 that displays summary current values design parameter values that may be selected using the design knobs of the configuration pane 720. The design block diagram 740 includes a design name 742 that identifies the current integrated circuit design. For example, the design block diagram 740 may use color coding to reflect the presence or absence of certain features and text reflecting the values of other design parameter for an integrated circuit design. For example, the design block diagram 740 may be an auto-updating block diagram that is updated in real-time to reflect changes in the design parameter values as they are made using the design knobs. In some implementations, a design parameters data structure is generated based on input received via a web application that displays an auto-updating block diagram 740 of a template design reflecting changes to values of the design parameters of the integrated circuit. In some implementations, the design block diagram 740 may display estimates of power, performance, and area for an integrated circuit design based on the currently selected design parameter values. For example, the PPA (power performance area) estimates may be updated instantly in real-time in response to changes made to the design parameter values using the design knobs. This feature may provide direct feedback on how chip will perform as design changes are made.

The display region 710 includes a build icon 750 that may be used to issue a command to build and test and integrated circuit design based on the design parameter values selected with the design knobs and/or reflected in the design block diagram. For example, the current design parameter values when the build command is issued may be encoded in design parameters data structure (e.g., a JSON file) that is accessed by a controller to start the build.

The display region 710 includes a status bar 760 that indicates a current status of the design (e.g., design, review, or building). For example, the display region 710 may be generated (e.g., by a web application server) using Python and/or Django front ended tools.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. One or more non-transitory computer-readable storage media storing instructions that, upon execution by processing circuitry, cause operations comprising:

providing multiple power management interfaces for communication between a processor core and a power management controller, wherein a power management interface of the multiple power management interfaces has a type and is selected, based on a set of factors, from one of:

a direct handshake hardware interface;

a memory-mapped bus interface; and a combination of the direct handshake hardware interface and the memory-mapped bus interface, wherein the set of factors relates to an architecture of the processor core, and wherein the processor core implements an interface to the power management controller independently of the type of the power management interface.

2. The one or more non-transitory computer-readable storage media of claim 1, wherein each one of the multiple power management interfaces is selected from one of the direct handshake hardware interface, the memory-mapped bus interface, or the combination of the direct handshake hardware interface and the memory-mapped bus interface.

3. The one or more non-transitory computer-readable storage media of claim 2, wherein registers are allocated based on the power management interface being the memory-mapped bus interface.

4. The one or more non-transitory computer-readable storage media of claim 3, wherein a first register is allocated in a power domain and a second register is allocated external to the power domain for use by the power management controller.

5. The one or more non-transitory computer-readable storage media of claim 3, wherein the communication between an internal controller of the processor core and the power management controller is based on a protocol that supports both the direct handshake hardware interface and the memory-mapped bus interface.

6. The one or more non-transitory computer-readable storage media of claim 5, wherein the protocol is used by the internal controller or the power management controller to initiate at least one of an idle power mode transition or an active mode transition at a power domain.

7. The one or more non-transitory computer-readable storage media of claim 5, wherein the power management controller is selected based on a power domain.

8. A method comprising:

providing multiple power management interfaces for communication between a processor core and a power management controller, wherein a power management interface of the multiple power management interfaces has a type and is selected, based on a set of factors, from one of:

a direct handshake hardware interface;

a memory-mapped bus interface; and a combination of the direct handshake hardware interface and the memory-mapped bus interface, wherein the set of factors relates to an architecture of the processor core, and wherein the processor core implements an interface to the power management controller independently of the type of the power management interface.

9. The method of claim 8, wherein the power management controller is external to the processor core, the processor core includes an internal controller, and the power management interface communicates between the power management controller and the internal controller.

10. The method of claim 9, further comprising:

providing registers when the memory-mapped bus interface is selected for communication between the internal controller and the power management controller.

11. The method of claim 10, wherein some of the registers are allocated in the processor core and some of the registers are allocated external to the processor core for use by the power management controller.

12. The method of claim 10, further comprising:

providing a protocol for communication between the internal controller and the power management controller which can work with both the direct handshake hardware interface and the memory-mapped bus interface.

13. The method of claim 12, wherein the protocol is used by the internal controller or the power management controller to initiate at least one of an idle power mode transition or an active power mode transition at the processor core.

14. A processing system comprising:

at least one power domain;

a power management controller; and a power management interface for communication between the at least one power domain and the power management controller, wherein the power management interface has a type that is selected, based on a set of factors, from one of:

a direct handshake hardware interface;

a memory-mapped bus interface; and p2 a combination of the direct handshake hardware interface and the memory-mapped bus interface, wherein the set of factors includes at least one of: a number of power domains, a power domain type, a power domain size, a power management mode, a level of power management control, a level of operational control, a level of performance control, or a power level, and wherein the at least one power domain implements an interface to the power management controller independently of the type of the power management interface.

15. The processing system of claim 14, wherein the power management controller is external to the at least one power domain, the at least one power domain includes an internal controller, and the power management interface communicates between the power management controller and the internal controller.

16. The processing system of claim 15, further comprising:

registers configured to enable communications between the internal controller and the power management controller when the power management interface is a memory-mapped bus interface.

17. The processing system of claim 16, wherein some of the registers are allocated in the at least one power domain and some of the registers are allocated external to the at least one power domain for use by the power management controller.

18. The processing system of claim 17, further comprising:

a protocol for communication between the internal controller and the power management controller which is configured to work with both the direct handshake hardware interface and the memory-mapped bus interface.

19. The processing system of claim 18, wherein the protocol is used by the internal controller or the power management controller to initiate at least one of an idle power mode transition or an active power mode transition at a processor core.

20. The processing system of claim 18, wherein the at least one power domain and the power management controller are selectable.

* * * * *